United States Patent [19]

Grosspietsch et al.

[11] Patent Number: 5,211,099
[45] Date of Patent: May 18, 1993

[54] SLAVE CYLINDER FOR A HYDRAULIC ACTUATING SYSTEM OF A MOTOR VEHICLE FRICTION CLUTCH

[75] Inventors: Wolfgang Grosspietsch, Schweinfurt; Gottfried Mader, Ebelsbach; Herbert Voit, Schweinfurt; Karl Müller, Poppenhausen, all of Fed. Rep. of Germany

[73] Assignee: Fichtel & Sachs AG, Schweinfurt, Fed. Rep. of Germany

[21] Appl. No.: 853,826

[22] Filed: Mar. 19, 1992

[30] Foreign Application Priority Data

Mar. 20, 1991 [DE] Fed. Rep. of Germany ....... 4109125

[51] Int. Cl.$^5$ .............................................. F01B 31/00
[52] U.S. Cl. ........................................ 92/107; 92/240; 92/245; 277/73
[58] Field of Search ................. 92/107, 240, 241, 242, 92/243, 244, 245; 277/73, 103, 173, 177, 205, 206 A

[56] References Cited

U.S. PATENT DOCUMENTS

| | | | |
|---|---|---|---|
| 859,326 | 7/1907 | McMullen | 277/73 |
| 2,670,973 | 3/1954 | Ginther et al. | 277/73 |
| 2,983,533 | 5/1961 | Tisch | 277/206 A |
| 4,310,162 | 1/1982 | Donovan | 277/103 |
| 4,618,154 | 10/1986 | Freudenthal | 277/205 |
| 4,706,970 | 11/1987 | Ramirez | 277/205 |
| 4,739,997 | 4/1988 | Smetana | 277/205 |
| 4,827,834 | 5/1989 | Leigh-Monstevens | 277/206 A |
| 5,040,905 | 8/1991 | Boyd | 277/206 A |

FOREIGN PATENT DOCUMENTS

| | | |
|---|---|---|
| 0363788 | 10/1989 | European Pat. Off. . |
| 2330750 | 6/1973 | Fed. Rep. of Germany . |
| 3020769 | 5/1980 | Fed. Rep. of Germany . |
| 2560336 | 2/1984 | France . |
| 1242466 | 3/1987 | U.S.S.R. . |
| 1332163 | 4/1988 | U.S.S.R. . |
| 126914 | 2/1920 | United Kingdom .................. 277/73 |
| 340378 | 1/1931 | United Kingdom .................. 277/73 |
| 2112490 | 10/1982 | United Kingdom . |

Primary Examiner—Thomas E. Denion
Attorney, Agent, or Firm—Anderson, Kill, Olick & Oshinsky

[57] ABSTRACT

A slave cylinder of the annular cylinder type is proposed, whereof the annular piston (45) able to slide axially between an outer cylinder wall (29) and an inner cylinder wall (33) is sealed by a grooved sealing ring (53) with respect to the pressure chamber (37). In order to be able to evacuate by means of a suction pump a hydraulic actuating system for a motor vehicle friction clutch, constructed using a slave cylinder of this type, before filling with hydraulic fluid, means are provided on the annular cylinder or in addition to the sealing lips (57) on the grooved sealing ring, which increase the sealing action of the sealing lips (57) when applying a vacuum to the hydraulic pressure chamber (37). The said means may be conical surfaces (61, 63) on the cylinder walls or a conical ring engaging in an annular groove (59) of the sealing ring (53). Additional sealing beads having a cross-sectional contour in the shape of a circular sector may be formed if necessary on the grooved sealing ring.

21 Claims, 4 Drawing Sheets

SLAVE CYLINDER FOR A HYDRAULIC ACTUATING SYSTEM OF A MOTOR VEHICLE FRICTION CLUTCH

BACKGROUND OF THE INVENTION

The invention relates to a slave cylinder for a hydraulic actuating system of a motor vehicle friction clutch.

Hydraulic actuating systems of motor vehicle friction clutches must be filled with hydraulic fluid after assembly, in which case it must be ensured that no air bubbles are enclosed in the hydraulic power transmission system between the master cylinder and slave cylinder. Since the subsequent venting of the system is time-consuming, particularly for the series assembly of such hydraulic power transmission systems, it is known to locate two pipes on the reservoir of the hydraulic actuating system by way of a reversing valve, whereof one pipe is connected to a vacuum pump and the other is connected to a pressure pump supplying the hydraulic fluid. By means of the vacuum pump, first of all in one position of the reversing valve, the actuating system is evacuated. Then, by reversing the reversing valve, the system is filled with hydraulic fluid. The filling operation can be carried out quickly in this way, without residual air remaining in the actuating system.

In conventional hydraulic actuating systems, the slave cylinder acts by way of a clutch release fork or the like on a clutch release bearing of the clutch. The slave cylinder of such systems normally has a cylindrical piston, which is sealed with respect to a tubular cylinder by ring packings on its peripheral wall. The ring packings guided for example in peripheral grooves of the piston may receive both the compressive forces occurring during operation, as well as the reduced pressure forces resulting at the time of filling. Since the diameter of the piston is relatively small, even the frictional forces occurring during operation are still acceptable.

The conditions are different if the slave cylinder has an annular cylindrical shape, so that it is arranged concentrically with respect to the transmission input shaft and avoiding a clutch release fork or the like is connected directly to the clutch release bearing of the clutch. Conventional slave cylinders of this type comprise an annular cylinder with an outer cylinder wall, an inner cylinder wall coaxial with the outer cylinder wall and an end wall hermetically connecting the cylinder walls at one end as well as an annular piston arranged to slide axially between the outer and the inner cylinder wall and furthermore a grooved sealing ring able to slide axially together with the annular piston, bearing by radially resilient sealing lips enclosing an annular groove therebetween, both on the outer as well as on the inner cylinder wall, at the end of the annular piston facing the end wall, which together with the cylinder walls and the end wall encloses a hydraulic pressure chamber. A pressure medium connection opens into the hydraulic pressure chamber in a conventional manner. In a slave cylinder of this type, the grooved sealing ring has a comparatively large diameter, with the result that the radial pressure, by which the sealing lips bear against the cylinder walls on account of their inherent elasticity, must be kept comparatively low, if the frictional forces between the sealing ring and annular cylinder are to remain at acceptable values. This problem is all the more serious as the annular piston must be sealed both radially inwards as well as radially outwards. Grooved sealing rings of the aforedescribed type are indeed able to receive compressive forces, but are able to provide a seal with respect to reduced pressure solely to a small extent, since in the case of reduced pressure in the hydraulic pressure chamber, they lift off the cylinder walls, so that in the case of filling assisted by reduced pressure, the actuating system can be evacuated only inadequately.

SUMMARY OF THE INVENTION

It is an object of the invention to provide a slave cylinder from the aforementioned annular cylinder, which is adequately hermetic not solely at the time of hydraulic excess pressure, but also in the case of reduced air pressure in its hydraulic pressure chamber, so that the slave cylinder can be used in hydraulic actuating systems of motor vehicle friction clutches, in which a reduced pressure is produced in the pressure chamber before filling with hydraulic fluid. However, in this case it should be ensured that during operation, the frictional forces conditional upon the seal remain low.

According to the invention, on the annular cylinder or in addition to the sealing lips on the grooved sealing ring, means are provided which increase the sealing action of the sealing lips in a predetermined position of the annular piston relative to the annular cylinder or when a reduced pressure is applied to the hydraulic pressure chamber. The invention is based on the consideration that during normal operation of the slave cylinder, at the time of actuation of the friction clutches, the sealing action is produced exclusively by the sealing lips. The sealing lips may therefore have dimensions such that during normal operation they produce sufficiently low frictional forces. The pressure chamber is exposed to a reduced pressure solely before filling with hydraulic fluid, so that the means provided in addition to the sealing lips can be constructed so that they increase the sealing action of the grooved sealing ring solely in this operating condition, the sealing lips are thus relieved of forces which attempt to lift them from the cylinder walls.

In a preferred embodiment of the invention it is provided that in the region of one of the end positions of the annular piston, the annular cylinder is provided with annular bearing surfaces, against which the sealing lips bear in the end position of the annular piston and which increase the radial pressure by which the sealing lips bear against the cylinder walls. The venting of the actuating system thus takes place in a fixed end position of the annular piston, in which the sealing lips are stretched mechanically beyond their inherent elasticity for the time during which the vacuum is effective, against the cylinder walls.

The annular bearing surfaces are appropriately cone surfaces, which in a first variation are provided on the cylinder walls or in a second variation are formed by a cone ring extending into the pressure chamber and engaging between the sealing lips in the end position of the piston. It will be understood that the cone ring can be formed in one piece on the annular cylinder, for example on its end wall, but may also be constructed as a component produced separately from the cylinder walls and the end wall and inserted in the annular cylinder.

The cone surfaces are preferably provided in the region of the end wall of the annular cylinder, in which region the hydraulic fluid connection also opens into the pressure chamber. At the time of filling of the actuating system with hydraulic fluid, in this way the annular cylinder needs solely to be brought into its inserted end position, in which the cylinder volume is also minimal, which facilitates the evacuation of the actuating system. Appropriately the grooved sealing ring is supported axially loosely on the annular piston, so that the annular piston does not need to be retained during the entire vacuum phase against the force of the return spring normally provided, which biases the piston into the extended position. With the beginning of the vacuum phase, the vacuum retains the loose grooved sealing ring in the inserted end position against the bearing surfaces.

In another embodiment of the invention, the relief of the reduced pressure on the sealing lips of the grooved sealing ring is achieved by additional sealing beads, which have essentially solely the purpose of reducing the atmospheric pressure acting on the sealing lips from the side of the annular piston when the vacuum is applied in the pressure chamber. For this purpose it is provided that the grooved sealing ring comprises an annular basic member, from which the sealing lips project towards the end wall of the annular cylinder and are separated from each other through an annular groove. On the side remote from the end wall of the annular cylinder, annular sealing beads are provided projecting radially from the outer periphery and from the inner periphery of the basic member towards the outer or the inner cylinder wall, respectively. The basic member forms axially between the sealing beads and the sealing lips annular gaps between itself and the cylinder walls. In order to keep the frictional forces in both sliding directions of the annular piston low, seen in an axial longitudinal sectional plane of the grooved sealing ring, the sealing beads appropriately have a cross-sectional contour in the form of a circular sector and it is preferably provided that before the grooved sealing ring is mounted in the annular cylinder, the diameter of each sealing bead has a smaller radial overlap with the diameter of the cylinder wall intended for abutment, than the diameter of the sealing lip intended for abutment against the same cylinder wall. In other words, the radial force, by which the sealing bead bears against the cylinder wall, is comparatively low and the sliding effect of the sealing bead is improved by the contour in the shape of a circular sector. Appropriately it is provided that the annular gaps respectively provided between the sealing bead and the sealing lip are filled with lubricant. On the one hand the lubricant reduces the frictional forces occurring during operation and on the other hand increases the sealing action at the time of filling of the actuating system with hydraulic fluid.

The various features of novelty which characterise the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
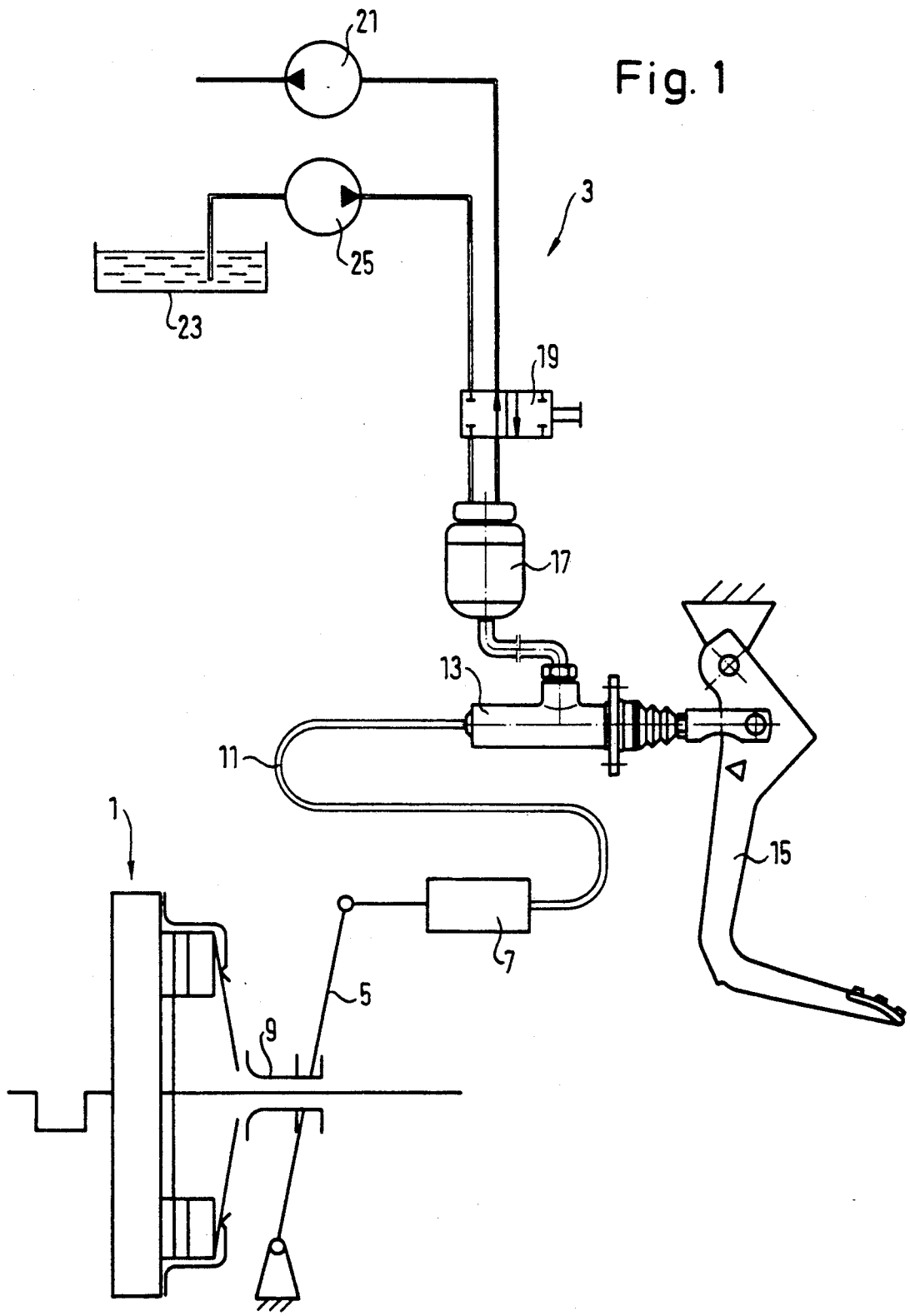
FIG. 1 is a basic diagram of a conventional motor vehicle frictional clutch with hydraulic actuating system, during filling with hydraulic fluid.

FIG. 1 shows in a basic illustration a conventional actuating system for a motor vehicle friction clutch 1 during filling with hydraulic fluid by means of a filling system 3. Associated with the clutch is a clutch release lever 5, which in its one end region is tiltably mounted for example on a transmission housing (not shown in detail) and at its other end is displaced by a slave cylinder 7. In its central region, the clutch release lever 5 acts on a clutch release bearing 9 of the clutch 1. The slave cylinder 7 is connected by way of a connecting pipe 11 to a master cylinder 13, which is actuated by means of a clutch pedal 15. The master cylinder 13 is connected in the conventional manner to a reservoir 17 for hydraulic fluid.

In order to be able to fill the actuating system with hydraulic fluid without subsequent venting measures, the reservoir 17 can be connected by way of a reversing valve 19 alternately to a suction pump 21 and to a pressure pump 25 conveying hydraulic fluid from a container 23. For filling the actuating system, the reservoir 17, the master cylinder 13, the connecting pipe 11 and the slave cylinder 7 are connected by means of the reversing valve 19 to the suction pump 21, which produces a vacuum in this system, whilst the pipe leading from the pressure pump 25 to the reservoir 17 is blocked. After the interior of the system has been evacuated, the pipe leading from the reservoir 17 to the suction pump 21 is blocked and the pipe leading to the pressure pump 25 is released, whereby the interior of the actuating system is filled with hydraulic fluid quickly and free from residual air. However, conventional hydraulic fluid filling systems function solely if the seals of the slave cylinder 7 are sufficiently tight both in the case of excess fluid pressure as well as reduced air pressure in the pressure chamber of the slave cylinder 7.

Figure 2:
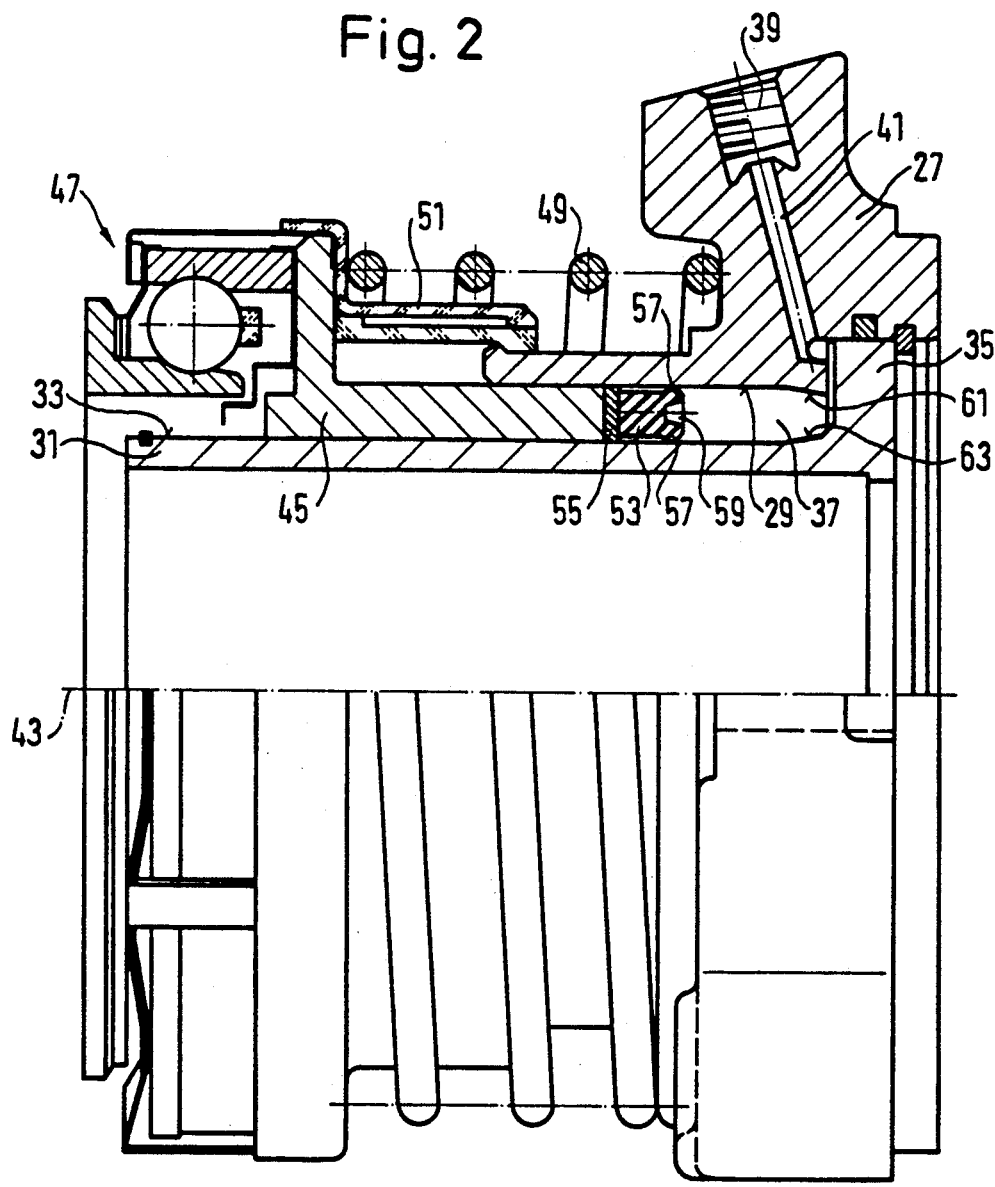
FIG. 2 is a partial section through a slave cylinder of the annular cylinder type, which allows the filling with hydraulic fluid in a system according to FIG. 1.

FIG. 2 shows a slave cylinder of the annular type according to the invention, which satisfies these requirements. A slave cylinder of this type has a comparatively large diameter and encloses, incorporated in the motor vehicle, the transmission input shaft leading to the clutch. The slave cylinder has an annular cylindrical housing 27 with an outer cylinder wall 29 and a tubular inner part 31, which forms an inner cylinder wall 33. The inner part 31 supports an end wall 35, which together with the cylinder walls 29, 33 defines a pressure chamber 37 for a hydraulic fluid. A pressure medium channel 41 leading to a pressure connection 39 opens in the region of the end wall 35.

An annular piston 45 is arranged to slide axially between the cylinder walls 29, 33 which together with the transmission input shaft (not shown) are concentric with respect to an axis of rotation 43, which annular piston 45 supports a clutch release bearing 47 for actuating the friction clutch, at its end axially remote from the pressure chamber 37. A tensioning spring 49 biases the annular piston 45 into its extended position. A cover 51 retained on the annular piston 45 prevents the penetration of dirt into the annular cylinder 45.

The annular cylinder 45 is sealed with respect to the pressure chamber 37 by a grooved sealing ring 53. The grooved sealing ring 53 is supported by way of a support ring 55 loosely on the end face of the annular piston 45 adjacent the end wall 35. On the side axially remote from the annular piston 45, the sealing ring 53 is provided with two annular sealing lips 57, whereof one bears against the outer cylinder wall 29 and the other bears against the inner cylinder wall 33 on account of the inherent elasticity of the resilient rubber sealing ring material. Radially between the sealing lips 57, the sealing ring 53 contains an annular groove 59 which is open towards the pressure chamber 37, which annular groove 59 extends substantially over the entire axial length of the sealing lips 57, in order to achieve a comparatively soft spring characteristic of the sealing lips 57 and thus comparatively low frictional forces during actuating operation of the clutch.

In order to increase the contact pressure of the sealing lips 57 during filling of the actuating system with hydraulic fluid, in the region of the end wall 35 closing off the pressure chamber 37, the outer cylinder wall 29 is provided with a conical surface 61 tapering towards the end wall 35 and the inner cylinder wall 33 is provided radially in opposition with a conical surface 63 widening out towards the end wall 35. For filling the system, the annular piston 45 is brought into its inserted end position, in which the conical surfaces 61, 63 increase the contact pressure of the sealing lips 57 so far that a vacuum adequate for the evacuation can be produced. During the filling phase, the annular piston 45 may be kept in the inserted end position; however, since the annular seal 53 is loose, it is sufficient if the annular piston 45 retains the grooved sealing ring solely until the beginning of the suction effect in the inserted position. When initiating the suction effect, the grooved sealing ring 53 is retained by vacuum, so that the annular piston 45 can be released and can return to its extended end position under the force of the pretensioning spring 49. The grooved sealing ring 53 will then be pushed out by the hydraulic fluid introduced under pressure, until it once more bears against the front end of the annular piston 45.

Variations of the slave cylinder will be described hereafter. Components having the same action are in this case designated with the reference numerals from FIG. 2. Reference will be made to the description of FIG. 2 for the explanation of the construction and method of operation of the slave cylinder.

Figure 3:
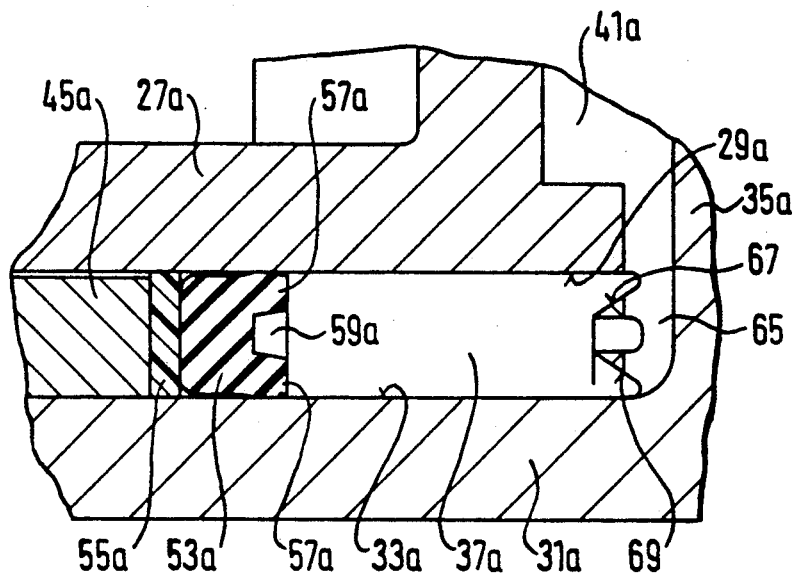
FIGS. 3 and 4 are detailed views of variations of the slave cylinder according to FIG. 2

FIG. 3 shows details of a first variation of the slave cylinder from the region of its pressure chamber 37a. In contrast to the slave cylinder of FIG. 2, in place of the conical surfaces 61, 63 of the cylinder walls 29, 33, a conical ring 65 is formed on the end wall 35a of the inner part 31a, which ring forms two annular conical surfaces 67, 69 tapering towards the annular piston 45a. The conical surfaces 67, 69 engage in the inserted end position of the annular piston 45a in the annular groove 59a of the grooved sealing ring 53a and force the sealing lips 57a away from each other towards the cylinder walls 29a, 33a. The pressure medium channel 41a opens out in the region of the conical ring 65.

Figure 4:
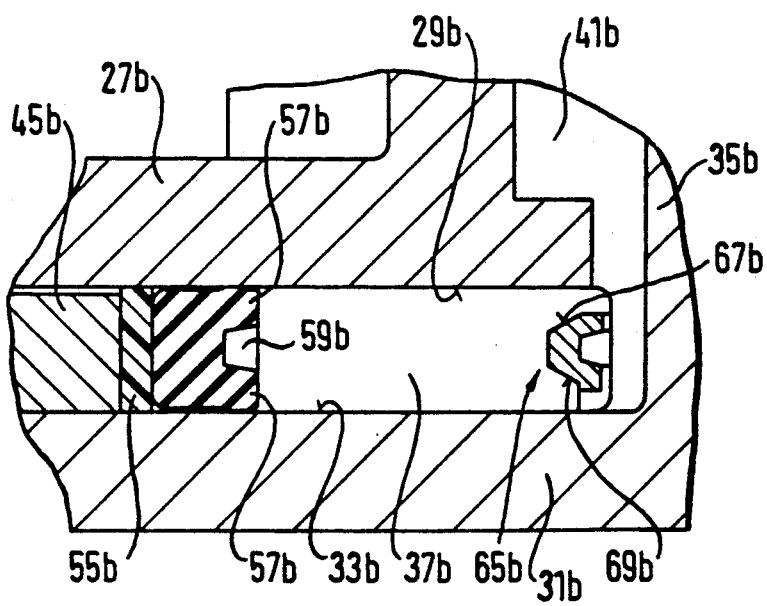

FIG. 4 shows a variation of the slave cylinder according to FIG. 3, which differs from this slave cylinder substantially solely due to the fact that the conical ring 65b is a component produced separately from the annular cylinder and in particular the end wall 35b and inserted in the housing 27b. The conical surfaces 67b and 69b of the conical ring 65b can be produced more simply in this way.

Figure 5:
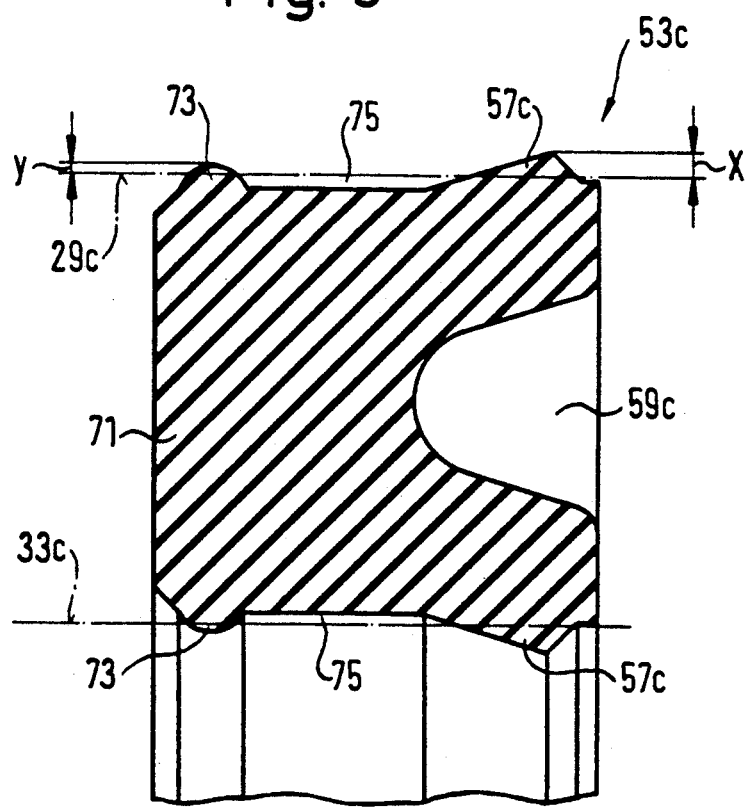
FIG. 5 is an axial longitudinal section through a variation of a grooved sealing ring.

FIG. 5 shows an axial longitudinal section through a grooved ring 53c for a slave cylinder according to FIG. 2, which dispenses with conical surfaces on the cylinder walls, which surfaces are effective in the end position of the annular piston or dispenses with a conical ring additionally projecting into the pressure chamber. In this case, FIG. 5 shows the grooved sealing ring 53c in the non-installed, unloaded state. The grooved sealing ring 53c consists, as also the grooved sealing rings of the afore-described embodiments integrally of resilient rubber material and has a basic member 71, from which annular sealing lips 57c project from the side remote from the annular piston. Provided radially between the sealing lips 57c is an open annular groove 59c pointing away from the annular piston, whereof the axial extent corresponds approximately to the extent of the sealing lips 57c and which determines the elasticity of the sealing lips 57c. Adjacent to the annular piston, the basic member 71 is provided both on its outer periphery as well as on its inner periphery with a sealing bead 73 respectively, which in the axial longitudinal section has a cross-sectional contour in the shape of a circular sector. As the shape of the outer cylinder wall 29c and of the inner cylinder wall 33c, indicated in dot-dash lines in FIG. 5, shows, the annular beads 73 overlap the cylinder walls 29c, 33c only slightly by a radius differential dimension y, however in each case by a smaller radius differential dimension than the sealing lip 57c respectively bearing against the same cylinder wall, whereof the overlap is marked at X. The material of the grooved sealing ring and the shape of the annular groove 59c is chosen so that in the installed state, the sealing lips 57c bear with comparatively low pretension against the cylinder walls 29c or 33c. The comparatively small overlap of the sealing beads 73 seals the grooved sealing ring to such an extent that a relief of the reduced pressure of the sealing lips 57c is prevented at the time of filling. In this connection, the shape of the sealing beads 73 ensures that the frictional force increases only slightly during operation. Axially between the sealing beads 73 on one side and the sealing lips 57c on the other side, the basic member 71 forms radial gaps 75 between itself and the respectively adjacent cylinder wall, which in the installed state are filled with lubricant. On the one hand the lubricant reduces the frictional force in the case of an axial displacement and on the other hand improves the sealing action of the grooved sealing ring.

While specific embodiments of the invention have been shown and described in detail to illustrate the application of the inventive principles, it will be understood that the invention may be embodied otherwise without departing from such principles.

What we claim is:

1. A slave cylinder for a hydraulic actuating system of a motor vehicle friction clutch, comprising:
   an annular cylinder with an outer cylinder wall, an inner cylinder wall coaxial with the outer cylinder wall and an end wall hermetically connecting the cylinder walls at one end;
   an annular piston arranged to slide axially between the outer cylinder wall and the inner cylinder wall;
   a grooved sealing ring able to slide axially together with the annular piston and bearing by radially resilient sealing lips coaxial with an annular groove radially therebetween, both against the outer cylinder wall as well as against the inner cylinder wall, at the end of the annular piston facing the end wall, which piston together with the cylinder walls and the end wall encloses a hydraulic pressure chamber;

a pressure medium connection opening into the hydraulic pressure chamber; and means which are at least one of provided on the annular cylinder and in addition to the sealing lips on the grooved sealing ring, said means increasing the sealing action of the sealing lips one of in a predetermined position of the annular piston relative to the annular cylinder and when applying a vacuum to the hydraulic pressure chamber, wherein in the region of one of the end positions of the annular piston, the annular cylinder is provided with annular bearing surfaces, against which the sealing lips bear in the end position of the annular piston and which increase the radial pressure by which the sealing lips bear against the cylinder walls, and further wherein the annular bearing surfaces are constructed as conical surfaces.

2. The slave cylinder of claim 1, wherein
the outer cylinder wall passes into a conical surface tapering towards the end position and the inner cylinder wall passes into a conical surface widening out towards the end position.

3. The slave cylinder of claim 2, wherein
the conical surfaces are provided in the region of the end wall of the annular cylinder.

4. The slave cylinder of claim 1, wherein
the grooved sealing ring comprises an annular groove open towards the end wall of the annular cylinder, between its sealing lips and located in the region of the end wall is a conical ring engaging in the annular groove by its conical surfaces, in the end position of the annular piston.

5. The slave cylinder of claim 4, wherein
the conical ring is constructed as a component produced separately from the cylinder walls and the end wall and inserted in the annular cylinder.

6. A slave cylinder for a hydraulic actuating system of a motor vehicle friction clutch, comprising:

an annular cylinder with an outer cylinder wall, an inner cylinder wall, coaxial with said outer cylinder wall, and an end wall, tightly connecting the cylinder walls at one end;

an annular piston arranged so as to be axially displaceable between said outer cylinder wall and said inner cylinder wall;

a grooved sealing ring which is axially displaceable together with said annular piston and which contacts both said outer cylinder wall and said inner cylinder wall by radially resilient sealing lips enclosing an annular groove between them, and which is arranged at the end of said annular piston, wherein said end faces said end wall and, together with the cylinder walls and said end walls, encloses a hydraulic pressure chamber;

annular contact faces which are arranged at said annular cylinder in the region of one of the end positions of said annular piston and are contacted by said sealing lips exclusively in the region of the end position of said annular piston and which increase the radial pressure by which said sealing lips contact the cylinder walls in the end position; and a pressure medium connection opening into said hydraulic pressure chamber.

7. The slave cylinder of claim 6, wherein said grooved sealing ring is supported axially loosely on said annular piston and said annular contact faces are provided in the region of the end wall of said annular cylinder.

8. The slave cylinder of claim 6, wherein said annular contact faces are constructed as conical surfaces.

9. The slave cylinder of claim 8, wherein said outer cylinder wall passes into a conical surface tapering towards the end position, and wherein said inner cylinder wall passes into a conical surface widening out towards the end position.

10. The slave cylinder of claim 9, wherein said conical surfaces are provided in the region of the end wall of said annular cylinder.

11. The slave cylinder of claim 8, wherein said grooved sealing ring comprises an annular groove open towards the end wall of said annular cylinder, between its sealing lips, and located in the region of said end wall, is a conical ring engaging in said annular groove by its conical surfaces, in the end position of said annular piston.

12. The slave cylinder of claim 11, wherein said conical ring is constructed as a component produced separately from the cylinder walls and said end wall and inserted in said annular cylinder.

13. A slave cylinder for a hydraulic actuating system of a motor vehicle friction clutch, comprising:

an annular cylinder with an outer cylinder wall, an inner cylinder wall, coaxial with the outer cylinder wall, and an end wall tightly connecting the cylinder walls at one end;

an annular piston arranged so as to be axially displaceable between said outer cylinder wall and said inner cylinder wall;

a grooved sealing ring which is arranged at the end of said annular piston facing said end wall of said annular cylinder, which is displaceable together with said annular piston and, together with the cylinder walls and said end wall of said annular cylinder encloses a hydraulic pressure chamber, wherein said grooved sealing ring further comprises:

an annular base body;

radially resilient sealing lips, which project away from said base body toward said end wall and encloses an annular groove between them;

a first sealing lip contacting said outer cylinder wall;

a second sealing lip contacting said inner cylinder wall;

sealing beads for increasing the sealing action when a vacuum is applied to said hydraulic pressure chamber, which sealing beads project radially from said base body and are arranged on a side of said sealing lips remote of said end wall of said annular cylinder, wherein a first sealing bead projects from an outer circumference of said base body toward said outer cylinder wall and a second sealing bead projects from an inner circumference of said base body toward said inner cylinder wall, and further wherein, in an absence of said grooved sealing ring, installed in said annular cylinder, diameters of said first and said second beads have a smaller radial overlap, with a diameter of said cylinder wall intended for contact, than a diameter of said sealing lip intended for contact at a same cylinder wall, and further wherein annular gaps exist axially between said sealing beads and said sealing lips and radially between said base body and the cylinder walls; and a pressure medium connection opening into said hydraulic pressure chamber.

14. The slave cylinder of claim 13, wherein, in an axial longitudinal sectional plane of said grooved sealing ring, said sealing beads have a cross-sectional contour in the shape of a circular sector.

15. The slave cylinder of claim 13, wherein said annular gaps are filled with lubricant.

16. The slave cylinder of claim 13, wherein, in the region of one of the end positions of said annular piston, said annular cylinder is provided with annular contact faces, against which said sealing lips bear in the end position of said annular piston and which increase the radial pressure by which said sealing lips bear against said cylinder walls.

17. The slave cylinder of claim 16, wherein said annular contact faces are constructed as conical surfaces.

18. The slave cylinder of claim 17, wherein said outer cylinder wall passes into a conical surface tapering towards the end position and said inner cylinder wall passes into a conical surface widening out towards the end position.

19. The slave cylinder of claim 18, wherein said conical surfaces are provided in the region of said end wall of said annular cylinder.

20. The slave cylinder of claim 17, wherein said grooved sealing ring further comprises an annular groove open towards said end wall of said annular cylinder, between said sealing lips and, located in a region of said end wall, is a conical ring engaging in said annular groove by its conical surfaces, in the end position of said annular piston.

21. The slave cylinder of claim 20, wherein said conical ring is constructed as a component produced separately from said cylinder walls and said end wall and inserted in said annular cylinder.

* * * * *